United States Patent
Kühne et al.

(10) Patent No.: US 11,024,081 B2
(45) Date of Patent: Jun. 1, 2021

(54) METHOD AND SYSTEM FOR OPERATING AT LEAST ONE PAIR OF VIRTUAL REALITY GLASSES IN A MOTOR VEHICLE

(71) Applicant: AUDI AG, Ingolstadt (DE)

(72) Inventors: Marcus Kühne, Beilngries (DE); Daniel Profendiner, Ingolstadt (DE); Nils Wollny, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/755,404

(22) PCT Filed: Sep. 12, 2018

(86) PCT No.: PCT/EP2018/074554
§ 371 (c)(1),
(2) Date: Apr. 10, 2020

(87) PCT Pub. No.: WO2019/072479
PCT Pub. Date: Apr. 18, 2019

(65) Prior Publication Data
US 2020/0320788 A1    Oct. 8, 2020

(30) Foreign Application Priority Data
Oct. 12, 2017   (DE) .................... 10 2017 218 214.8

(51) Int. Cl.
*G06T 19/00* (2011.01)
*G06K 9/00* (2006.01)

(52) U.S. Cl.
CPC ........ *G06T 19/003* (2013.01); *G06K 9/00671* (2013.01); *G06K 9/00832* (2013.01); *G06T 19/006* (2013.01)

(58) Field of Classification Search
None
See application file for complete search history.

(56) References Cited

U.S. PATENT DOCUMENTS

2007/0103461 A1* 5/2007 Suzuno ................... G06T 15/20
                                                           345/419
2008/0310707 A1* 12/2008 Kansal .................. G06T 19/006
                                                           382/154

(Continued)

FOREIGN PATENT DOCUMENTS

DE           101 56 219 C1     8/2003
DE    10 2014 214 516 A1      1/2016

(Continued)

OTHER PUBLICATIONS

WIPO Translation of International Preliminary Report on Patentability for PCT/EP2018/074554, completed Sep. 27, 2019, 7 pp.

(Continued)

*Primary Examiner* — Edward Martello
(74) *Attorney, Agent, or Firm* — Staas & Halsey LLP

(57) ABSTRACT

A predefined virtual theme defines a specific virtual way of movement within a virtual environment. A route is selected which best matches the predefined virtual theme Movements of the motor vehicle are detected during a journey along the selected route. The virtual reality glasses are controlled so that a vehicle occupant wearing the virtual reality glasses moves virtually within the virtual environment according to the detected movements of the motor vehicle and according to the predefined virtual way of movement of the predefined virtual theme.

20 Claims, 1 Drawing Sheet

(56) References Cited

U.S. PATENT DOCUMENTS

| | | | |
|---|---|---|---|
| 2010/0292886 A1* | 11/2010 | Szczerba | G01S 13/723 |
| | | | 701/31.4 |
| 2013/0009994 A1* | 1/2013 | Hill | G06N 3/006 |
| | | | 345/633 |
| 2016/0048027 A1 | 2/2016 | Shpigelman | |
| 2017/0103571 A1 | 4/2017 | Beaurepaire | |
| 2017/0203768 A1 | 7/2017 | Alaniz et al. | |
| 2017/0352185 A1* | 12/2017 | Bonilla Acevedo | B60J 1/20 |
| 2018/0040163 A1 | 2/2018 | Donnelly et al. | |
| 2018/0211414 A1* | 7/2018 | Cronin | B60W 40/02 |

FOREIGN PATENT DOCUMENTS

| | | |
|---|---|---|
| DE | 10 2014 019 579 A1 | 6/2016 |
| DE | 10 2015 100 943 A1 | 7/2016 |
| DE | 102017218214.8 | 10/2017 |
| EP | 3 330 151 A1 | 6/2018 |
| KR | 10-2017-015213 A | 2/2017 |
| WO | PCT/EP2018/074554 | 9/2018 |

OTHER PUBLICATIONS

International Search Report dated Dec. 7, 2018 in corresponding International Patent Application No. PCT/EP2018/074554.
Office Action dated Jul. 18, 2018 in corresponding German Patent Application No. 10 2017 218 214.8.

* cited by examiner

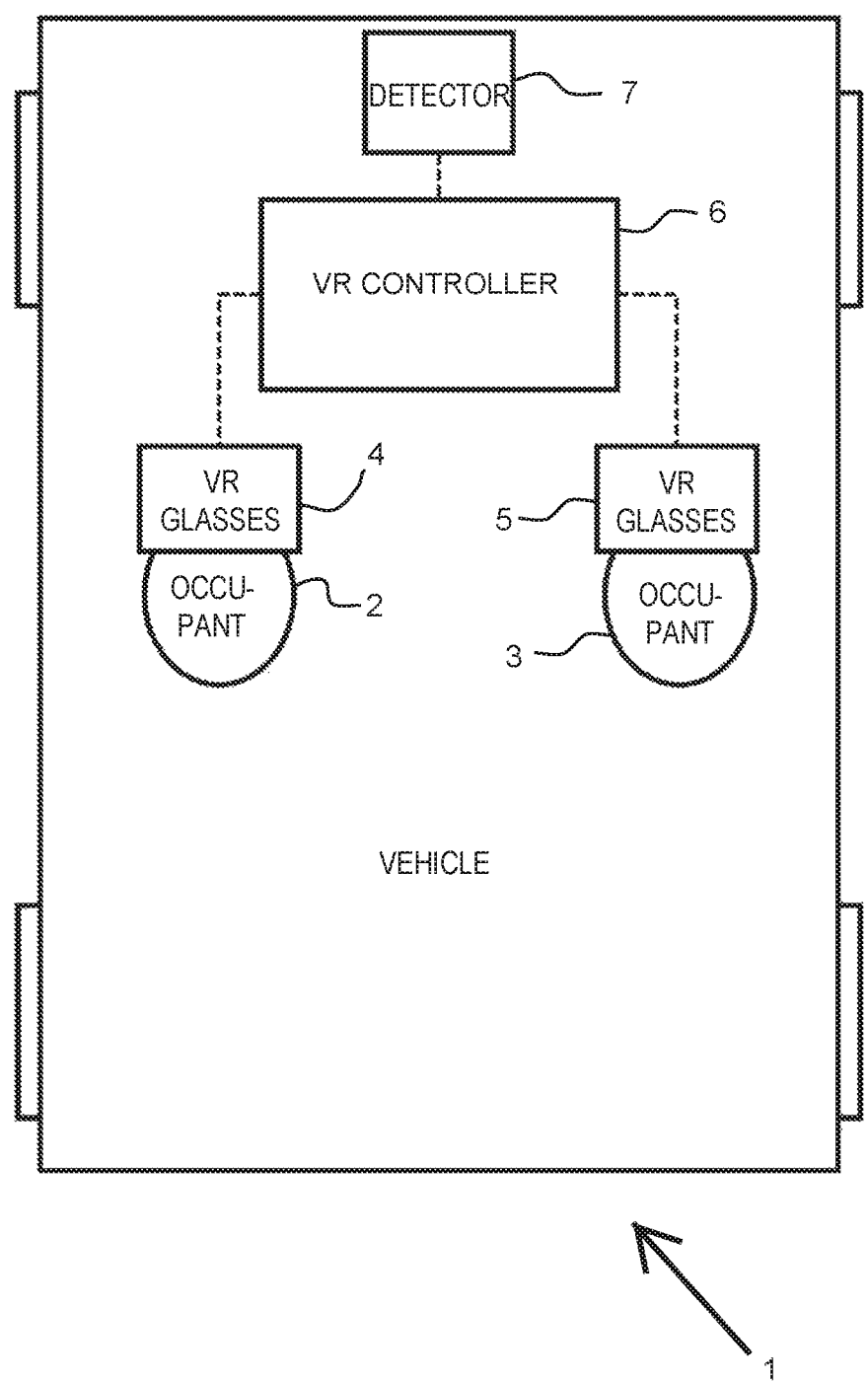

METHOD AND SYSTEM FOR OPERATING AT LEAST ONE PAIR OF VIRTUAL REALITY GLASSES IN A MOTOR VEHICLE

CROSS REFERENCE TO RELATED APPLICATIONS

This application is a U.S. national stage of International Application No. PCT/EP2018/074554, filed on Sep. 12, 2018. The International Application claims the priority benefit of German Application No. 10 2017 218 214.8 filed on Oct. 12, 2017. Both the International Application and the German Application are incorporated by reference herein in their entirety.

BACKGROUND

Described below are a method and a system for operating at least one pair of virtual reality glasses in a motor vehicle.

In the future more and more persons will utilize immersive technologies in their vehicles, for example for support while performing the driving task or else simply just for entertainment or for relaxation. However, particularly the utilization of virtual reality applications in vehicles may also be problematic because so-called simulator sickness can occur here. This is a kind of special form of kinetosis which can occur as a result of dissonances between what is seen and one's own motion that is felt. This means that virtual reality glasses may possibly display to a wearer thereof virtual contents which suggest to the wearer visually a different motion than actually takes place on the basis of the arrangement in a traveling vehicle.

One known possibility for counteracting this is by combining the representation of virtual reality contents or augmented reality contents by electronic smartglasses and contents which correspond to the real motion in the vehicle. In this regard, DE 10 2014 019 579 A1 discloses for example a method for operating electronic smartglasses in a vehicle, wherein for example text is represented in a first region and contents which move according to the actual motion of the vehicle are represented in a second region.

DE 101 56 219 C1 discloses a method for reducing kinetosis disturbances. In that context, it is proposed to provide image signals by way of optical playback devices during the journey, which image signals are modified depending on the journey such that for a passenger the visual impression of the images viewed is correlated with the currently subjectively perceived position and motion values.

Moreover, DE 10 2014 214 516 A1 very generally discloses the use of electronic smartglasses in a motor vehicle.

SUMMARY

The method described below provides a particularly reliable possibility which can be used to prevent wearers of virtual reality glasses from feeling sick during operation of virtual reality glasses in a traveling motor vehicle.

In the method for operating at least one pair of virtual reality glasses in a motor vehicle, a virtual theme is predefined which defines a specific virtual way of movement within a virtual environment. Such a virtual theme can concern for example a virtual journey with a motor vehicle, a virtual flight with a flying vehicle, a virtual journey with a watercraft or the like. The virtual theme may be any form of a specific virtual way of movement within an associated virtual environment. The nature of the virtual theme per se may be playful, informative or else purely entertaining. By way of example, it would also be conceivable for the virtual theme to concern the virtual flight by a magic carpet along a particularly real landscape or else along a fantasy landscape. In principle, any virtual themes are predefinable which define a specific virtual way of movement within a specific virtual environment.

In the method, after predefining the virtual theme, a route is selected, the path of which best matches the predefined virtual theme. During a journey along the selected route, own movements of the motor vehicle are detected and the virtual reality glasses are controlled in such a way that a vehicle occupant wearing the virtual reality glasses moves virtually within the virtual environment according to the detected own movements of the motor vehicle and according to the predefined virtual way of movement of the predefined virtual theme.

Accordingly, it is thus provided that a vehicle occupant, having put on the virtual reality glasses, moves virtually within a virtual environment in accordance with the predefined virtual theme, wherein the occupant's virtual movement correlates with the detected own movements of the motor vehicle while the latter travels along the real selected route. If the motor vehicle travels along a right-hand bend, for example, then the wearer of the virtual reality glasses also executes a right-hand bend within the displayed virtual environment. If the motor vehicle travels up and down along a hilly landscape, for example, then the wearer of the virtual reality glasses also correspondingly moves up and down within the displayed virtual environment.

By virtue of the fact that the route is selected such that its path best matches the predefined virtual theme, the virtual reality glasses can be controlled particularly simply. Depending on the extent to which the real path deviates from the real virtual theme, it is indeed possible or necessary that the displayed virtual contents, that is to say the virtual movement within the displayed virtual environment, must still be dynamically adapted somewhat to the traveling situation. However, the similarity of the selected real route in comparison with the predefined virtual theme means that the adaptational and thus computational complexity for the control of the virtual reality glasses is relatively low.

Thus, with a relatively low hardware outlay with regard to the computing power and possibly also storage capacity to be provided, the virtual reality glasses can ensure that the vehicle occupant who has put on the virtual reality glasses moves virtually within the displayed virtual environment particularly realistically according to the detected own movements of the motor vehicle. The wearer of the virtual reality glasses is thus completely immersed in the displayed virtual environment. By virtue of the fact that the virtual reality glasses are controlled such that the virtual movement at least substantially corresponds to the detected own movements of the motor vehicle, it can be ensured that simulator sickness as mentioned in the introduction does not occur or is reduced to a minimum even for users who are sensitive in this regard.

Furthermore, substantially during any journeys particularly entertaining virtual themes can be introduced by the virtual reality glasses, thus resulting in an added value for the vehicle occupants during the journey with the motor vehicle. In this case, the motor vehicle need not necessarily be underway on public roads. Instead, it is also possible, for example, for strong emphasis to be placed on the experiential character during the journey with the motor vehicle with the virtual reality glasses having been put on. In that case, for example, it is also possible to travel along non-public roads and thus closed-off routes with a matching path, such that particularly immersive experiences are possible by using virtual reality glasses.

One advantageous embodiment provides for the route selected to be a route to the path of which the virtual theme had been adapted beforehand. Thus, the virtual theme may be adapted to a very specific route and the path thereof in a targeted manner even before the journey with the motor vehicle is actually effected. This adapted virtual theme, more precisely a data set in this regard, can then be rendered for example on the virtual reality glasses or else on some other storage device. With knowledge of the virtual theme adapted beforehand to a very specific route, exactly this route can then be selected, along which the motor vehicle is then moved. The resulting own movements of the motor vehicle particularly with regard to cornering or else on hill ascents and hill descents are then particularly well suited to being converted into corresponding virtual movements within the displayed virtual environment.

An alternative advantageous embodiment provides for the route selected to be a route whose curve courses best match the predefined virtual theme. Moreover, it can alternatively or additionally also be provided that the route selected is a route whose height profile best matches the predefined virtual theme. It is thus also possible that a very specific predefined virtual theme need not have been adapted in advance to a very specific real route. Instead, it is possible that once the virtual theme has been predefined, a route that matches as much as possible is selected within, for example, a specific search radius around the location of the motor vehicle, wherein in particular the height profile and/or curve courses of the route best match(es) the predefined virtual theme. In the case of this procedure, it is likewise possible in a particularly simple manner for the virtual contents displayed by the virtual reality glasses to be dynamically adapted to the respective traveling situation in a particularly simple manner since the selected route matches the predefined virtual theme particularly well. If the virtual theme concerns for example a movement within a virtual environment having a particularly large number of curves, then the route can be selected such that it likewise has a large number of curves, in particular even if a different route to a specific destination would be available, for example, but it has few curves. In the case of this procedure, therefore, reaching a specific destination particularly rapidly does not necessarily matter, instead the main emphasis is on the selected route matching the character of the predefined virtual theme particularly well.

In accordance with a further advantageous embodiment, it is provided that a plurality of virtual themes are provided for selection, which each define different virtual ways of movement within respective virtual environments, wherein the virtual theme is predefined for the journey depending on a selection by a user. The vehicle occupant can thus choose from a multiplicity of virtual themes in order to select the theme which is the most appropriate, e.g. the most entertaining, for him/her. According to his/her selection, a route that matches as much as possible is then in turn selected in accordance with the procedures mentioned above.

A further advantageous embodiment provides for the motor vehicle to drive along the selected route partly autonomously or fully autonomously. In the latter case, in particular, depending on the route traveled, under certain circumstances, it is not necessary at all for a driver to sit in the motor vehicle. Irrespective of whether the motor vehicle drives along the selected route partly autonomously, fully autonomously or manually, the method can be offered for example by mobility service providers such as, for example, taxi companies or the like as an additional service. Such mobility service providers could equip their vehicles with a corresponding technology in order, by offering the method or an advantageous embodiment of the method, to differentiate themselves from competitors and to create additional sources of income.

It is particularly advantageous if the method is booked in the form of a service. In other words, the method can thus be offered and booked as a service. This affords the advantages already mentioned above. The booking can be effected for example for a vehicle owned by the occupant or during a journey with a third-party vehicle.

A further advantageous embodiment provides for at least one second pair of virtual reality glasses to be controlled in such a way that a further vehicle occupant wearing the second pair of virtual reality glasses moves virtually within the virtual environment according to the detected own movements of the motor vehicle and according to the predefined virtual way of movement of the predefined virtual theme. Multiple vehicle occupants may be detected and respective virtual representations of the vehicle occupants may be displayed by the virtual reality glasses. Thus, if a plurality of vehicle occupants are sitting in the motor vehicle and have each put on a pair of virtual reality glasses, then they can move virtually together within the same virtual environment, for example, according to the virtual theme provided, in so doing they can interact with one another and perceive respective representations of one another in a virtual way. Thus, it is also possible for a plurality of vehicle occupants to be moved from a start to a destination, while during the journey a highly immersive experience that is playful, informative or purely entertaining in nature is provided for the vehicle occupants. As mentioned, the vehicle occupants may even see one another within the displayed virtual environment and a shared interaction takes place according to the predefined virtual theme.

The system for operating at least one pair of virtual reality glasses in a motor vehicle is configured to predefine a virtual theme which defines a specific virtual way of movement within a virtual environment; to select a route, the path of which best matches the predefined virtual theme; on the basis of own movements of the motor vehicle that are detected during a journey along the selected route, to control the virtual reality glasses in such a way that a vehicle occupant wearing the virtual reality glasses moves virtually within the virtual environment according to the detected own movements of the motor vehicle and according to the predefined virtual way of movement of the predefined virtual theme. Advantageous configurations of the method should be regarded as advantageous configurations of the system, and vice versa, wherein the system performs the method.

BRIEF DESCRIPTION OF THE DRAWINGS

Further advantages, features and details are evident from the following description of exemplary embodiments and with reference to the drawing. The features and feature combinations mentioned above and also the features and feature combinations described below or illustrated in the sole FIGURE are usable not only in the combination respectively indicated, but also in other combinations or by themselves, without departing from the scope of the invention.

The drawing is a schematic block diagram of a motor vehicle in which a system for operating a plurality of pairs of virtual reality glasses is provided.

DETAILED DESCRIPTION

A motor vehicle 1 is shown in a highly schematic illustration in the sole FIGURE. There are two vehicle occupants 2, 3 sitting in the motor vehicle 1 and each has respectively put on a pair of virtual reality glasses 4, 5. Moreover, a system 6 for operating the two pairs of virtual reality glasses 4, 5 is arranged in the motor vehicle 1. Furthermore, a detector or detection device 7, arranged in the motor vehicle 1, is designed to detect movements of the motor vehicle 1 during the journey by the motor vehicle 1.

The detection device 7 may include a wide variety of sensors installed on the vehicle, for example, in order to detect accelerations, velocities and the like. Alternatively or additionally, it is also possible, contrary to the present schematic illustration, for the detection device 7 to be part of the system 6, wherein the detection device 7 includes corresponding sensors installed in the system, rather than on the vehicle. The entire system 6 can also be portable, that is to say need not necessarily be installed fixedly in the vehicle. In that case, the system 6 can be conceived of as a type of portable electronic hardware box.

A method for operating the two pairs of virtual reality glasses 4, 5 is described in greater detail below. Firstly, at least one virtual theme which defines a specific virtual way of movement within a virtual environment is predefined by the system 6. The virtual theme can be understood to mean a very specific form of a virtual experience which can be booked as a service by the vehicle occupants 2, 3 for example beforehand or during the journey with the motor vehicle 1. By way of example, it is possible that the motor vehicle 1 can drive fully autonomously, such that both vehicle occupants 2, 3 can utilize the pairs of virtual reality glasses 4, 5 completely safely.

The virtual theme defines a specific virtual way of movement within a specific virtual environment. By way of example, the virtual theme can concern a virtual journey with a motor vehicle, a virtual flight with a flying vehicle, or alternatively a virtual journey with a watercraft. A wide variety of virtual themes or virtual experiences are possible, in principle. In this regard, it is also possible, for example, for a flight with a space shuttle to be offered as a virtual theme. A respective virtual theme may always include a very specific virtual way of movement, for example the journey with a land vehicle, with an aircraft or else for example with a watercraft such as, for example, a ship or a submarine within a very specific associated virtual environment. Moreover, it is possible that the system 6 can offer a plurality of such themes for selection, which the vehicle occupants 2, 3 can select and book as chargeable services, for example.

As soon as a very specific virtual theme has been selected by one of the vehicle occupants 2, 3, a route is selected, the path of which best matches the correspondingly selected virtual theme. In principle, there are two different procedures here. The route selected can be for example a route to the path of which the virtual theme had already been adapted anyway beforehand. In that case, therefore, by way of example, a data set concerning the virtual theme had already been created beforehand on the basis of a very specific path of a very specific route. In that case, the route selected can be exactly this route, which, with regard to its path, then matches the virtual theme adapted beforehand particularly well.

Alternatively, however, it is also possible for the route selected to be a route whose curve courses best match the predefined virtual theme, wherein in addition it can also be taken into account that a height profile of the route to be selected best matches the predefined virtual theme. In this case, therefore, firstly a very specific virtual theme is predefined, and only after that is one of a plurality of possible routes selected, wherein the virtual theme had not already been adapted in advance very precisely to the selected route. By virtue of the fact that the route choice is selected in particular with regard to the curve course and to its height profile such that the path matches the selected virtual theme, the complexity for the dynamic adaptation to the chosen route during operation of the pairs of virtual reality glasses 4, 5 is kept within limits.

As soon as the virtual theme has then been predefined and a corresponding route has been selected, the motor vehicle 1 travels along the route. In this case, own movements of the motor vehicle 1 are detected continuously by the detection device 7. Data in this regard flow into the system 6, which then controls the two pairs of virtual reality glasses 4, 5 in such a way that the respective vehicle occupants 2, 3 move virtually within the virtual environment displayed by the respective pairs of virtual reality glasses 4, 5 according to the detected own movement of the motor vehicle 1 and according to the predefined virtual way of movement of the predefined virtual theme.

Thus, if the motor vehicle 1 drives through a tight right-hand bend, then the virtual reality glasses 4, 5 are also controlled such that it appears to the vehicle occupants 2, 3 as though they would likewise drive through a sharp right-hand bend or move in some other way through a sharp right-hand bend within the virtual environment displayed. The same applies to any other own movements of the motor vehicle 1. During the journey with the motor vehicle 1, the vehicle occupants 2, 3 thus experience, by the virtual reality glasses 4, 5, a virtual movement that seems particularly realistic within a displayed virtual environment. On the one hand, the journey with the motor vehicle 1 becomes particularly entertaining as a result. On the other hand, as a result it is also possible to prevent the vehicle occupants 2, 3 from feeling sick despite having put on virtual reality glasses 4, 5. This is because the virtual contents displayed by the virtual reality glasses 4, 5 suggest visually to the vehicle occupants 2, 3 exactly what their organs of equilibrium feel on account of the own movements of the motor vehicle 1.

Moreover, it is also possible for the two vehicle occupants 2, 3 to be detected during the journey with the motor vehicle 1 by a camera system, for example, wherein respective camera data are transmitted to the system 6. The latter then controls the virtual reality glasses 4, 5 such that the vehicle occupants 2, 3 receive respective virtual representations of their fellow passengers within the displayed virtual environment when the virtual reality glasses 4, 5 are worn. Thus, within the virtual environment displayed by the virtual reality glasses 4, 5, the vehicle occupants 2, 3 can also see one another by way of the respective virtual representations and can also optionally interact with one another.

The described system 6 and the associated method for operating the virtual reality glasses 4, 5 can be offered as an additional remunerable service by taxi companies or other mobility service providers, for example. Thus, vehicle occupants can enjoy a wide variety of virtual contents during the journey, specifically without them feeling sick, since the virtual contents displayed correlate with the own movements of the motor vehicle during the journey.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for operating at least one pair of virtual reality glasses in a motor vehicle, comprising:
    storing a predefined virtual theme of a specific virtual way of movement within a virtual environment;
    selecting a real route which best matches the predefined virtual theme;
    detecting movements of the motor vehicle during a journey along the selected real route; and
    controlling a first pair of the virtual reality glasses so that a first vehicle occupant wearing the first pair of the virtual reality glasses moves virtually within the virtual environment according to the movements of the motor vehicle detected by said detecting and according to the virtual way of movement of the predefined virtual theme.

2. The method according to claim 1, wherein the virtual theme concerns one of:
    a virtual journey with a virtual motor vehicle;
    a virtual flight with a flying vehicle;
    a virtual journey with a watercraft.

3. The method according to claim 2, wherein the real route selected depends upon a path within the virtual theme, adapted beforehand.

4. The method according to claim 2, wherein the real route selected includes curve courses best matching the predefined virtual theme.

5. The method according to claim 4, wherein the real route selected has a height profile best matching the predefined virtual theme.

6. The method according to claim 5,
    wherein a plurality of virtual themes are provided for selection, each defining different virtual ways of movement within respective virtual environments, and
    wherein the method further comprises selecting the predefined virtual theme for the journey depending on a selection by a user.

7. The method according to claim 6, wherein the motor vehicle drives along the real route, selected by said selecting, at least partly autonomously.

8. The method according to claim 7, further comprising obtaining the method from a service provider.

9. The method according to claim 8,
    wherein at least two pair of virtual reality glasses are controlled, and
    further comprising virtually moving a second vehicle occupant, wearing a second pair of the virtual reality glasses, within the virtual environment according to the detected movements of the motor vehicle and according to the predefined virtual way of movement of the predefined virtual theme.

10. The method according to claim 9,
    further comprising detecting the first and second vehicle occupants, and
    wherein said controlling includes displaying respective virtual representations of the first and second vehicle occupants by the at least two pair of virtual reality glasses.

11. The method according to claim 1,
    wherein a plurality of virtual themes are provided for selection, each defining different virtual ways of movement within respective virtual environments, and
    wherein the method further comprises selecting the predefined virtual theme for the journey depending on a selection by a user.

12. The method according to claim 1, wherein the motor vehicle drives along the real route, selected by said selecting, at least partly autonomously.

13. The method according to claim 1, further comprising obtaining the method from a service provider.

14. The method according to claim 1,
    wherein at least two pair of virtual reality glasses are controlled, and
    further comprising virtually moving a second vehicle occupant, wearing a second pair of the virtual reality glasses, within the virtual environment according to the detected movements of the motor vehicle and according to the predefined virtual way of movement of the predefined virtual theme.

15. The method according to claim 14,
    further comprising detecting the first and second vehicle occupants, and
    wherein said controlling includes displaying respective virtual representations of the first and second vehicle occupants by the at least two pair of virtual reality glasses.

16. A system for operating at least one pair of virtual reality glasses in a motor vehicle, comprising:
    a storage configured to store a predefined virtual theme of a specific virtual way of movement within a virtual environment;
    a detector configured to detect movements of the motor vehicle during a journey; and
    at least one processor configured to
        determine a selected real route best matching the predefined virtual theme, and
        control a first pair of the virtual reality glasses so that a first vehicle occupant wearing the first pair of the virtual reality glasses moves virtually within the virtual environment according to the movements of the motor vehicle and according to the virtual way of movement of the predefined virtual theme.

17. The system according to claim 16,
    wherein the storage stores a plurality of virtual themes are provided for selection, each defining different virtual ways of movement within respective virtual environments, and
    wherein the at least one processor is further configured to select the predefined virtual theme from among the plurality of virtual themes in the storage in response to selection by a user.

18. The system according to claim 16, wherein the at least one pair of virtual reality glasses includes at least two pair of virtual reality glasses, and
    wherein the at least one processor is further configured to control a second pair of the virtual reality glasses so that a second vehicle occupant wearing the second pair of the virtual reality glasses moves virtually within the virtual environment according to the movements of the motor vehicle and according to the virtual way of movement of the predefined virtual theme.

19. The system according to claim 18,
    wherein the detector is further configured to detect the first and second vehicle occupants, and
    wherein the at least one processor is further configured to control the at least two pair of virtual reality glasses to display respective virtual representations of the first and second vehicle occupants.

20. A motor vehicle for operation with at least one occupant wearing at least one pair of virtual reality glasses, comprising:
   at least one processor configured to at least partly control movement of the motor vehicle autonomously; and
   a removable system for operating the at least one pair of virtual reality glasses, including
      a storage configured to store a predefined virtual theme of a specific virtual way of movement within a virtual environment;
      a detector configured to detect movements of the motor vehicle during a journey; and
      a controller configured to
         determine a selected real route best matching the predefined virtual theme, and
         control the at least one pair of the virtual reality glasses so that the at least one vehicle occupant respectively wearing the at least one pair of the virtual reality glasses moves virtually within the virtual environment according to the movements of the motor vehicle and according to the virtual way of movement of the predefined virtual theme.

* * * * *